United States Patent
Dietz et al.

(10) Patent No.: US 6,234,254 B1
(45) Date of Patent: May 22, 2001

(54) APPARATUS AND METHOD FOR CONTROLLING THE EFFICIENCY OF THE WORK CYCLE ASSOCIATED WITH AN EARTHWORKING MACHINE

(75) Inventors: Hans P. Dietz, Naperville; Eric A. Reiners, St. Charles; Thomas G. Skinner, Aurora, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/280,914

(22) Filed: Mar. 29, 1999

(51) Int. Cl.$^7$ .................................................. A01B 67/00
(52) U.S. Cl. .................................. 172/3; 701/50; 37/414
(58) Field of Search ................................ 172/2, 3, 4, 4.5, 172/5, 6, 7, 8, 9; 701/50, 54; 477/110, 111; 180/53.4, 53.8, 53.7, 197; 37/348, 382, 414

(56) References Cited

U.S. PATENT DOCUMENTS

| | | | |
|---|---|---|---|
| 3,913,419 | * 10/1975 | Sale et al. ............................ | 74/857 |
| 4,125,166 | * 11/1978 | Bergius ................................. | 172/1 |
| 5,056,615 | * 10/1991 | Duthie et al. ........................ | 180/306 |
| 5,297,649 | * 3/1994 | Yamamoto et al. .................. | 180/197 |
| 5,305,213 | * 4/1994 | Boardman et al. ............... | 364/424.1 |
| 5,333,479 | * 8/1994 | Yamamoto et al. .................... | 172/3 |
| 5,720,358 | 2/1998 | Christensen et al. ............... | 180/53.4 |
| 5,816,335 | * 10/1998 | Yamamoto et al. .................. | 172/4.5 |
| 5,974,352 | * 10/1999 | Shull ................................... | 701/50 |
| 5,996,703 | * 12/1999 | Yamamoto et al. .................. | 172/4.5 |
| 6,035,249 | * 3/2000 | Yamamoto et al. .................. | 701/50 |

* cited by examiner

Primary Examiner—Victor Batson
(74) Attorney, Agent, or Firm—David M. Masterson; Liza J. Meyers

(57) ABSTRACT

An apparatus for controlling the torque associated with a power train of a machine having a work implement is disclosed. A plurality of position sensors sense the position associated with the work implement and responsively produce respective position signals. A controller modifies the desired engine speed in response to the angular position of the work implement and regulates the speed of the engine at the modified desired engine speed to control the power train torque.

14 Claims, 4 Drawing Sheets

APPARATUS AND METHOD FOR CONTROLLING THE EFFICIENCY OF THE WORK CYCLE ASSOCIATED WITH AN EARTHWORKING MACHINE

TECHNICAL FIELD

The present invention relates generally to controllably operating a machine to increase the machine work cycle, and more particularly to controlling the engine speed of the machine while the machine is capturing material.

BACKGROUND ART

Work machines such as loaders and the like are used for moving mass quantities of material. These machines have work implements consisting primarily of a bucket linkage. The work bucket linkage is controllably actuated by at least one hydraulic cylinder. An operator typically manipulates the work implement to perform a sequence of distinct functions to load the bucket.

In a typical work cycle, the operator first positions the bucket linkage at a pile of material, and lowers the bucket downward until the bucket is near the ground surface. Then the operator directs the bucket to engage the pile. The operator subsequently raises the bucket through the pile to fill the bucket, then the operator racks or tilts back the bucket to capture the material. Finally, the operator dumps the captured load to a specified dump location. The work implement is then returned to the pile to begin the work cycle again.

The earthmoving industry has an increasing desire to increase the productivity of the work cycle. Although high rimpull ratings of the machine have been found to generally increase the productivity of the work cycle (rimpull is known as the tractive force that a machine is able to generate), it has been found that a machine producing high amounts of rimpull can negatively effect certain portions of the work cycle. For example, during the digging portion of the work cycle, machine rimpull has been found to oppose the lift force of the work implement, which negatively effects the ability of the machine to lift a load of material. The present invention is directed toward overcoming the problems associated with producing high amounts of rimpull during the digging portion of the work cycle.

DISCLOSURE OF THE INVENTION

In one aspect of the present invention, an apparatus for controlling the torque on the power train of a machine is disclosed. A plurality of position sensors sense the position associated with the work implement and responsively produce respective position signals. A controller modifies the desired engine speed in response to the angular position of the work implement and regulates the speed of the engine at the modified desired engine speed to control the power train torque.

BRIEF DESCRIPTION OF THE DRAWINGS

For a better understanding of the present invention, reference may be made to the accompanying drawings in which.

BEST MODE FOR CARRYING OUT THE INVENTION

Figure 1:
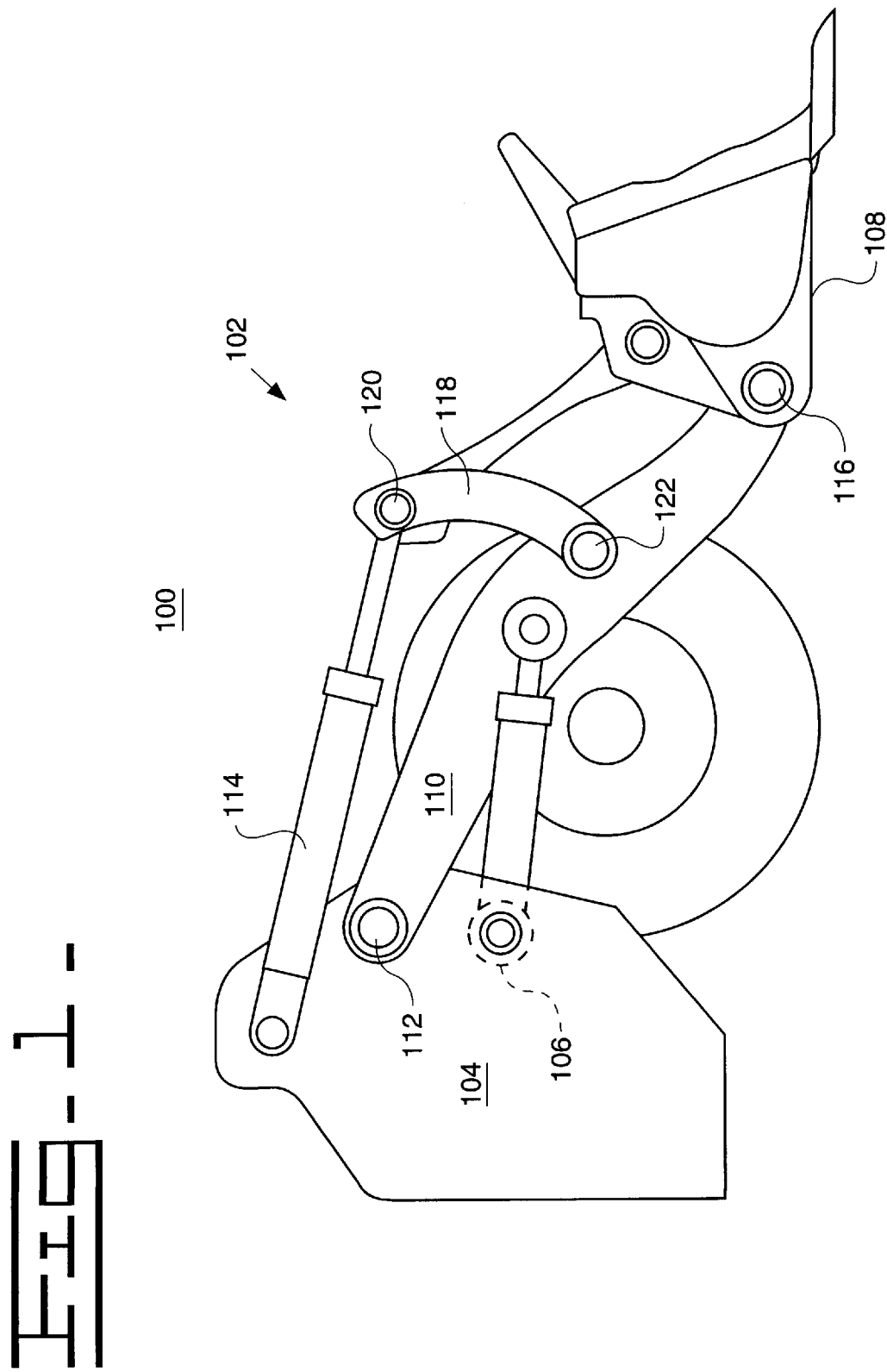
FIG. 1 is a side view of a forward portion of a loader machine or wheel type loader.

The present invention is directed toward controlling the driveline torque of an earth working machine, such as a wheel loader, to increase the productivity of the machine's work cycle. FIG. 1 shows a forward portion 100 of a wheel type loader machine 104 having work implement 102 that includes a payload carrier in the form of a bucket 108. Although the present invention is described in relation to a wheel type loader machine, the present invention is equally applicable to many earth working machines such as track type loaders, hydraulic excavators, and other machines having similar loading implements. The bucket 108 is connected to a lift arm assembly or boom 110, that is raised by two hydraulic lift actuators or cylinders 106 (only one of which is shown) about a boom pivot pin 112 (pin A) that is attached to the machine frame. The bucket 108 is tilted by a bucket tilt actuator or cylinder 114 about a tilt pivot pin 116 (pin B). A boom link 118 is attached to the tilt cylinder 114 via pin 120 (pin E) and to the boom via pin 122 (pin F).

Figure 2:
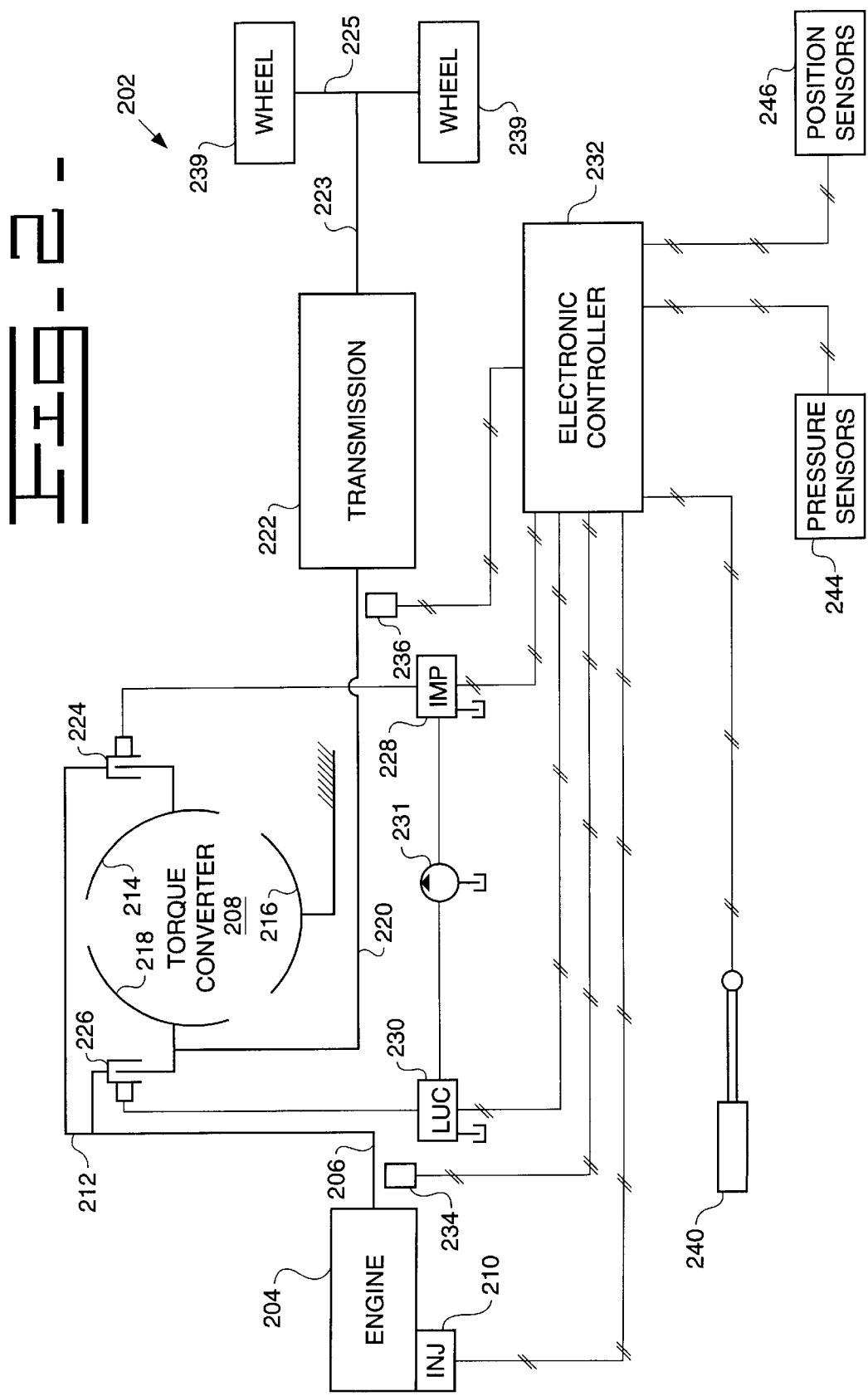
FIG. 2 is a block diagram of the drive train of the wheel loader.

A power train 202 associated with the wheel loader is illustrated in FIG. 2. The power train 202 includes an engine 204 having a shaft 206 connected to a hydrodynamic torque converter 208. For example, the engine 204 may include a plurality of solenoid operated fuel injectors that are used to control the amount of fuel delivered to the engine. The torque converter 208 includes a rotating housing 212, an impeller element 214, a reactor element 216, and a turbine element 218 that is connected to a centrally located output shaft 220. The output shaft 220 provides the input to a multi speed transmission 222. The output of the transmission rotates a drive shaft 223 that is rotatably connected to an axle 225 that drives a set of drive wheels 239.

The power train 202 may also include a disc-type input clutch or impeller clutch 224 that is located between the engine 204 and the torque converter 208 for controllably coupling the rotating housing to the impeller element, and a disc-type lockup clutch 226 for selectively coupling the rotating housing to the turbine element and the output shaft for a direct mechanical connection that effectively bypasses the torque converter. An electrohydraulic impeller clutch valve 228 provides fluid flow to actuate the impeller clutch, while an electrohydraulic lockup clutch valve 230 provides fluid flow to actuate the lockup clutch. A fixed or variable displacement pump 231 delivers pressurized fluid to the clutches 228, 230.

An electronic controller 232 is provided to control the operation of the power train. Preferably, the electronic controller 232 includes a microprocessor. It is noted that the term microprocessor is meant to include microcomputers, microprocessors, integrated circuits and the like capable of being programmed. The electronic controller contains sufficient electronic circuitry to convert input signals from a plurality of sensors, make several computations based on the input signals, and generate output signals with sufficient power to drive a plurality of solenoids for actuating the fuel injectors 210, the impeller clutch 224, and the lockup clutch 226. Preferably, the microprocessor is programmed with a plurality of preselected logic rules for producing one or more output signals in response to receiving one or more input signals.

The controller may receive several signals pertaining to the operation of the power train. An engine speed sensor 234 produces an engine speed signal that is responsive to the flywheel rotation or a gear that is mounted on the camshaft. A torque converter speed sensor 236 produces a torque converter speed signal that is responsive to the rotational speed and direction of the torque converter output shaft.

A throttle control 240 is included to indicate a desired speed of the engine 204. The throttle control 240 is manually selectable by the operator and produces a desired engine speed signal that is indicative of the desired speed of the engine. The controller produces an engine speed control signal to selectively operate the fuel injectors to regulate the engine speed in response to the desired engine speed signal.

The electronic controller 232 receives position signals produced by position sensors 246 that measure the position of the work implement 100. For example, the position sensors 246 may include displacement sensors that sense the amount of cylinder extension in the lift and tilt hydraulic cylinders respectively. The work implement 100 position may also be derivable from the work implement joint angle measurements. Thus, an alternative device for producing a work implement position signal includes rotational angle sensors such as rotatory potentiometers, for example, which measure the rotation of one of the lift arm pivot pins from which the geometry of the lift arm assembly or the extension of the lift cylinders can be derived. The work implement position may be computed from either the hydraulic cylinder extension measurements or the joint angle measurement by trigonometric methods.

The electronic controller 232 may also receive pressure signals produced by pressure sensors 244 that measure the force exerted on the work implement 100. The pressure sensors sense the hydraulic pressures in the lift and tilt hydraulic cylinders and produce signals responsive to the pressures of the respective hydraulic cylinders. For example, the cylinder pressure sensors may sense the lift and tilt hydraulic cylinder head and rod end pressures, respectively. It is noted that the pressure sensors may equally sense the pressure of the variable displacement pump that delivers pressurized fluid to the hydraulic cylinders.

The electronic controller receives one or more of the above described signals and produces an engine speed control signal to control the speed of the engine. The present invention modifies the desired engine speed in response to determining that the machine is digging or capturing material. By modifying the desired engine speed and thus the actual speed of the engine, the present invention controls the power train torque or rimpull to provide for optimal lift forces and allow the bucket to sweep through a pile and capture material.

Figure 3:
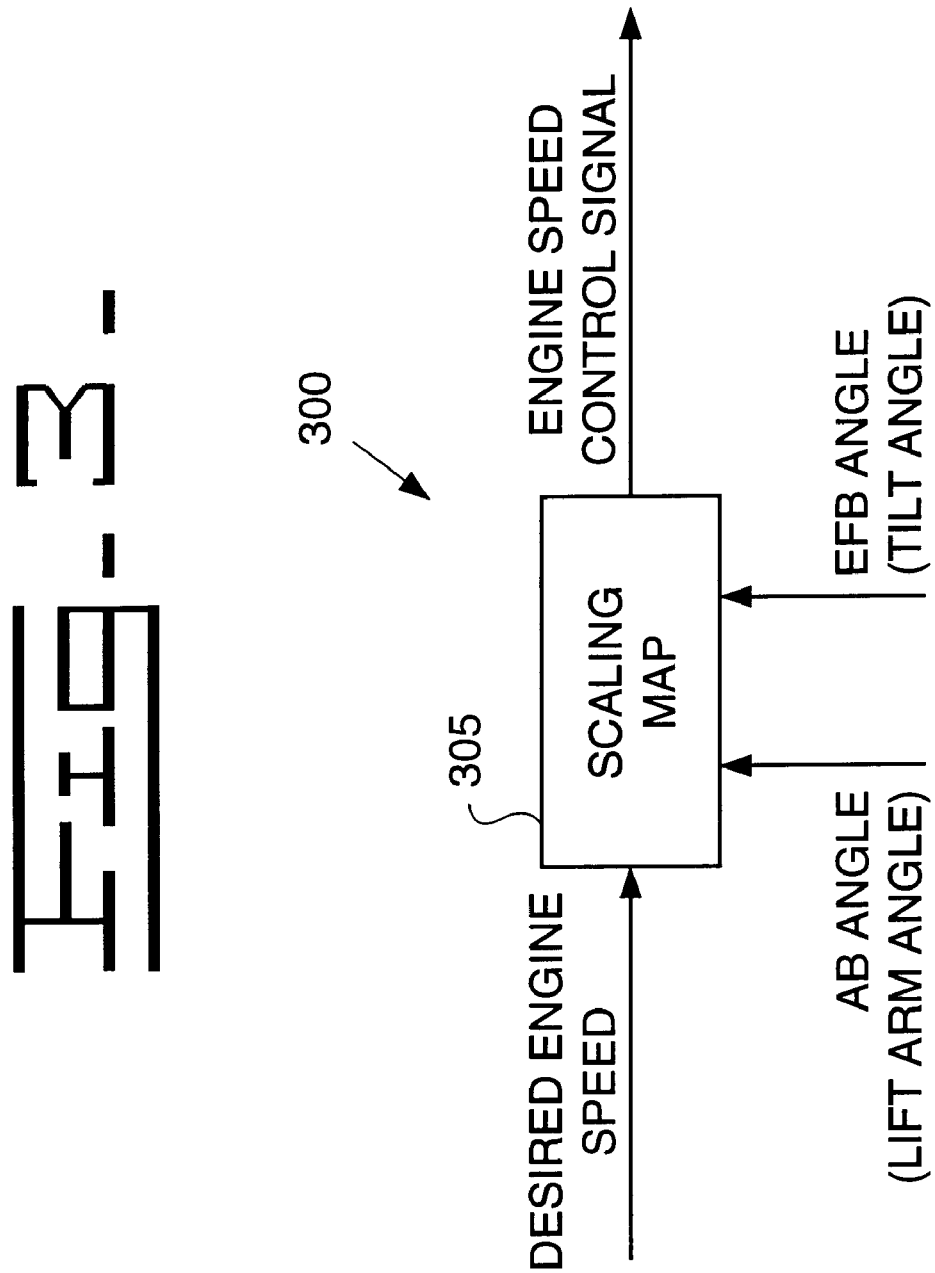
FIG. 3 is a block diagram of an embodiment of an electronic control system of the wheel loader.

Reference is now made to the block diagram of FIG. 3, which represents the rimpull control 300 associated with the present invention. The controller 232 receives a signal indicative of a desired engine speed. The desired engine speed may be determined by several means, including: determined as a function of the throttle position, determined as a function of torque converter speed ratio, or determined as a function of other aspects of the power train operation. The desired engine speed may additionally be a predetermined value that is resident in the software of the controller. Thus, the desired engine speed signal may be produced or generated by a variety of means.

Once the desired engine speed is known, the controller determines the position of the work implement and modifies the desired engine speed based on the implement position. Referring to block 305, the controller receives the implement position signals and scales the desired engine speed signal in response to the implement position representing a digging condition.

For example, referring to FIG. 1, the controller receives the implement position signals and determines the angle of an imaginary line passing through pins A and B relative to a horizontal reference line. If the angle of the line passing through pins A and B relative to a horizontal reference line (angle AB) is equal to or less than zero, then the implement is said to be in a digging position. Thus, angle AB represents the lift angle of the boom 110 or the lift angle of the work implement 102. The controller additionally determines the angle of an intersection of two lines, one passing through ins E and F and the other passing through pins F and (angle EFB). Angle EFB represents the pivot or tilt angle of the bucket 108 ranging from a dumped position to a racked position. Thus, the present invention modifies the desired engine speed to reduce the machine rimpull when (1) the boom 110 is in a digging position and (2) the bucket 108 has captured material and is being racked back.

In the preferred embodiment, a look up table is used to store a plurality of scaling values that correspond to a plurality of values associated with angle AB and a plurality of values associated with angle EFB. The look up table is populated by values based on empirical data. Based on the angular information, the controller selects a scaling value and multiplies the scaling value by the desired engine speed to reduce the actual engine speed and thus the rimpull of the machine. The controller regulates the speed of the engine in response to the modified desired engine speed. Preferably, the scaling value is between the values of 1.00 and 0.90. For example, values less than one are associated with AB angles less than zero degrees and EFB angles between 48 and 155 degrees. Note, the actual values of the map may vary depending upon desired performance. For example, under certain digging conditions when the bucket has a large angle of attack and the lift angle is substantially less than zero, then it may be preferable to utilize maximum machine rimpull to penetrate the soil. Finally, it would be apparent to one skilled in the art that the look up table can be replaced by an empirical equation to produce the scaling value based on the angular position of the implement.

Figure 4:
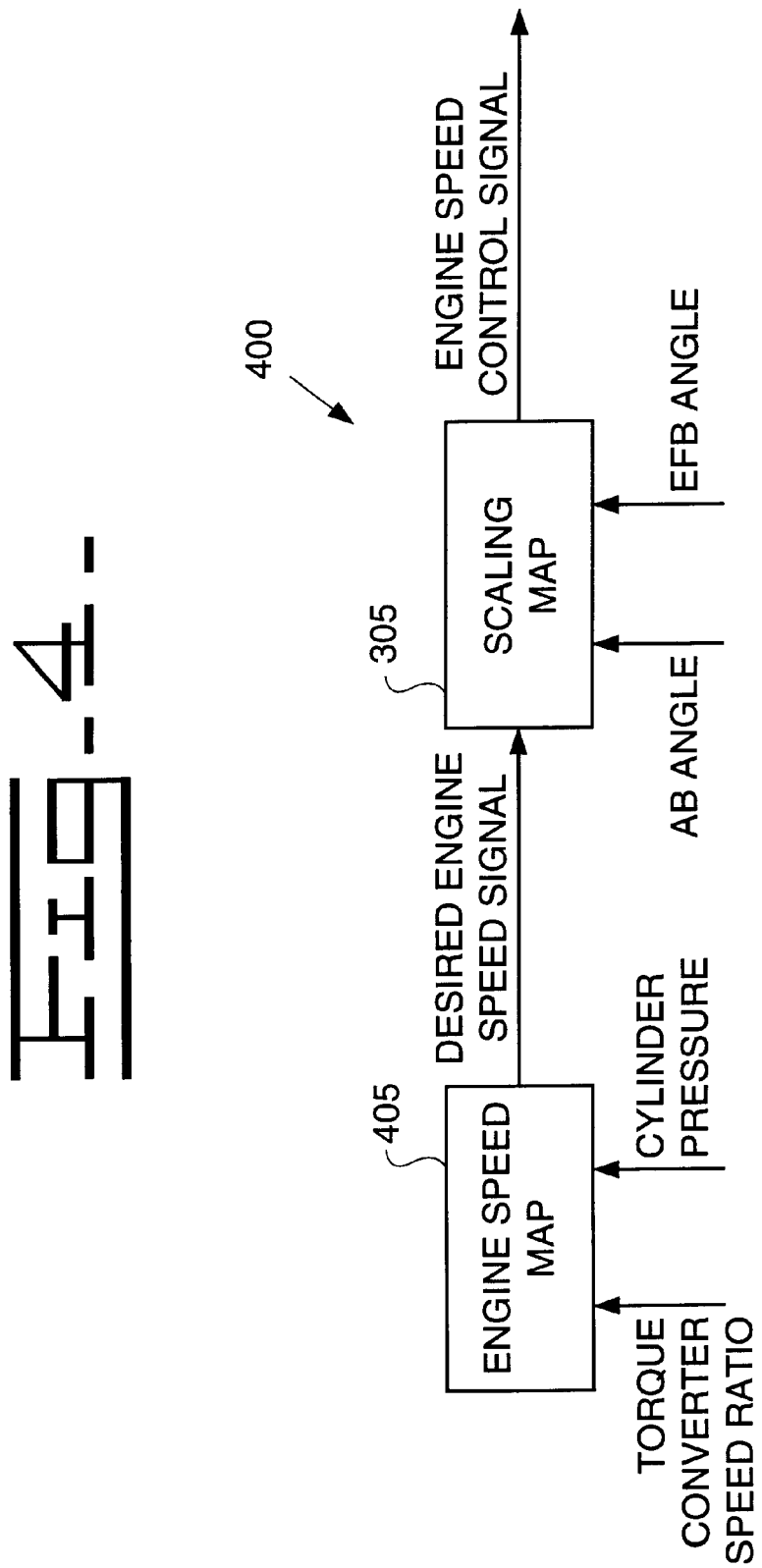
FIG. 4 is a block diagram of another embodiment of an electronic control system of the wheel loader.

Another embodiment of the present invention is shown by the block diagram of FIG. 4. The embodiment shown in FIG. 4 represents a method for determining a desired engine speed based on torque converter speed ratio and implement pump pressure. The controller receives the torque converter speed signal and the engine speed signal, and calculates the torque converter speed ratio in a well known manner. The controller 232 additionally receives the pressure signals, and based on the torque converter speed ratio, determines a desired engine speed.

More particularly, the controller determines the hydraulic fluid pressure required by the work implement. The controller receives signals indicative of the fluid pressures associated with the hydraulic cylinders, and determines the required implement pressure. For example, the required implement pressure may be set equal to the greater of the fluid pressures associated with the hydraulic cylinders, or the pump pressure. Here, the controller determines the desired engine speed based on the required implement pressure. Thus, in the embodiment described, the desired engine speed corresponds to a maximum drive train torque based on the actual engine speed and implement pressure.

For example, as shown by block 405, a software look-up table is used to store a plurality of desired engine speed values that correspond to a plurality of torque converter speed ratio values and implement pressure values. The controller selects the desired engine speed value in response to the torque converter speed ratio and implement pressure. The values contained in the look-up table may be based on empirical data, mathematical equations, or other such means. Moreover, the desired engine speed may additionally be determined in response to an empirical equation.

Once the desired engine speed is determined, the controller modifies the desired engine speed as described above.

Advantageously, the present invention modifies the desired engine speed to reduce rimpull in response to certain portions of the digging cycle. It has been found that in certain implement positions the lifting force is negatively offset by too much rimpull; thereby, reducing the amount of lift force that is available for the work implement to lift the bucket through a pile of hardened material. By optimizing the engine speed, the rimpull force can be like wise optimized to achieve desired lift forces.

Other aspects, objects and advantages of the present invention can be obtained from a study of the drawings, the disclosure and the appended claims.

What is claimed:

1. An apparatus for controlling the torque associated with a power train of a machine having a work implement, the power train including an engine, comprising:

a plurality of position sensors that sense a position associated with the work implement and responsively produce respective position signals;

an engine speed sensor that senses the speed of the engine and responsively produces an engine speed signal;

means for producing a signal indicative of a desired speed of the engine; and a controller that receives the position signals, determines an angular position of the work implement, receives the actual and desired engine speed signals, modifies the desired engine speed in response to the angular position of the work implement and a software look-up table that stores a plurality of scaling values that correspond to a plurality of angular values associated with the work implement, wherein the controller selects at least one of the plurality of scaling values in response to the angular position of the work implement, multiplies the selected scaling value by the desired engine speed, and regulates the speed of the engine based on the modified desired engine speed to control the power train torque.

2. An apparatus, as set forth in claim 1, wherein the controller determines that the implement is in a digging position and modifies the desired engine speed in response thereto.

3. An apparatus, as set forth in claim 2, wherein the controller determines that the implement has captured material and modifies the desired engine speed in response thereto.

4. An apparatus, as set forth in claim 1, wherein the desired engine speed signal is produced in response to a position of an engine speed throttle.

5. An apparatus, as set forth in claim 1, including a torque converter speed sensor that senses the output speed of the torque converter and responsively produces a torque converter speed signal, wherein the desired engine speed signal is produced as a function of a ratio of the torque converter output speed to the actual engine speed.

6. An apparatus, as set forth in claim 5, including a plurality of pressure sensors that sense the hydraulic fluid pressure associated with respective hydraulic cylinders of the work implement and responsively produce respective pressure signals, wherein the desired engine speed signal is produced in response to the hydraulic fluid pressure requested by the work implement based on the pressure signals.

7. An apparatus, as set forth in claim 6, including a software look-up table that stores a plurality of desired engine speed values that correspond to a plurality of torque converter speed ratio values and implement pressure values, wherein the controller selects the desired engine speed value in response to the torque converter speed ratio and implement pressure.

8. A method for controlling torque associated with a power train of a machine having a work implement, the power train including an engine, comprising:

sensing a position associated with the work implement and responsively producing respective position signals sensing the speed of the engine and responsively producing an engine speed signal;

producing a signal indicative of the desired speed of the engine; and receiving the position signals, determining an angular position of the work implement, receiving the actual and desired engine speed signals and, modifying the desired engine speed in response to the angular position of the work implement, storing a plurality of scaling values that correspond to a plurality of angular values associated with the work implement, selecting at least one of the plurality of scaling values in response to the angular position of the work implement, multiplying the selected scaling value by the desired engine speed, and regulating the speed of the engine based on the modified desired engine speed to control the power train torque.

9. A method, as set forth in claim 8, including the steps of determining that the implement is in a digging position and modifying the desired engine speed in response thereto.

10. A method, as set forth in claim 9, including the steps of determining that the implement has captured material and modifying the desired engine speed in response thereto.

11. A method, as set forth in claim 8, including the step of producing the desired engine speed signal in response to a position of an engine speed throttle.

12. A method, as set forth in claim 8, including the steps of sensing an output speed of a torque converter and responsively produces a torque converter speed signal, wherein the desired engine speed signal is produced as a function of a ratio of a torque converter output speed to the actual engine speed.

13. A method, as set forth in claim 12, including the step of sensing the hydraulic fluid pressure associated with respective hydraulic cylinders of the work implement and responsively producing respective pressure signals, wherein the desired engine speed signal is produced in response to the hydraulic fluid pressure requested by the work implement based on the pressure signals.

14. A method, as set forth in claim 12, including the step of storing a plurality of desired engine speed values that correspond to a plurality of torque converter speed ratio values and implement pressure values, and selecting the desired engine speed value in response to the torque converter speed ratio and implement pressure values.

* * * * *